United States Patent
Du et al.

(10) Patent No.: US 8,913,751 B2
(45) Date of Patent: Dec. 16, 2014

(54) KEY MANAGEMENT AND NODE AUTHENTICATION METHOD FOR SENSOR NETWORK

(75) Inventors: Zhiqiang Du, Shaanxi (CN); Jun Cao, Shaanxi (CN); Manxia Tie, Shaanxi (CN); Zhenhai Huang, Shaanxi (CN)

(73) Assignee: China IWNCOMM Co. Ltd. (CN)

( * ) Notice: Subject to any disclaimer, the term of this patent is extended or adjusted under 35 U.S.C. 154(b) by 404 days.

(21) Appl. No.: 13/503,171

(22) PCT Filed: Jun. 2, 2010

(86) PCT No.: PCT/CN2010/073466
§ 371 (c)(1),
(2), (4) Date: May 17, 2012

(87) PCT Pub. No.: WO2011/047548
PCT Pub. Date: Apr. 28, 2011

(65) Prior Publication Data
US 2012/0300939 A1    Nov. 29, 2012

(30) Foreign Application Priority Data

Oct. 21, 2009   (CN) .......................... 2009 1 0218626

(51) Int. Cl.
*H04L 9/08*    (2006.01)
(Continued)

(52) U.S. Cl.
CPC ............ *H04L 63/061* (2013.01); *H04L 63/062* (2013.01); *H04L 63/08* (2013.01);
(Continued)

(58) Field of Classification Search
CPC ...... H04L 63/061; H04L 63/062; H04L 63/08
USPC ................. 380/277–280, 285–286, 255–259; 713/163, 150, 168–169
See application file for complete search history.

(56) References Cited

U.S. PATENT DOCUMENTS

| | | |
|---|---|---|
| 7,486,795 B2 | 2/2009 | Eschenauer et al. |
| 2005/0140964 A1* | 6/2005 | Eschenauer et al. ............ 356/10 |

(Continued)

FOREIGN PATENT DOCUMENTS

| | | |
|---|---|---|
| CN | 101610452 A | 12/2009 |
| CN | 101674179 A | 3/2010 |
| CN | 101699891 A | 4/2010 |

OTHER PUBLICATIONS

Su, Z. et al., "Key Management Schemes and Protocols for Wireless Sensor Networks," *Journal of Software*, May 31, 2007, vol. 18, No. 5, pp. 1218-1231 (English translation of Abstract is on first page).

(Continued)

*Primary Examiner* — Venkat Perungavoor
*Assistant Examiner* — Amir Mehrmanesh
(74) *Attorney, Agent, or Firm* — DLA Piper LLP (US)

(57) ABSTRACT

A key management and node authentication method for a sensor network is disclosed. The method comprises the following steps of: 1) keys pre-distribution: before deploying the network, communication keys for establishing security connection between nodes are pre-distributed to all of nodes by a deployment server. 2) Keys establishment: after deploying the network, a pair key for the security connection is established between nodes, which includes the following steps of: 2.1) establishment of shared keys: the pair key is established between neighbor nodes in which the shared keys are existed; 2.2) path keys establishment: the pair key is established between the nodes in which there is no shared keys but there is a multi-hop security connection. 3) Node identity (ID) authentication: before formally communicating between nodes, the identity is authenticated so as to determine the legality and the validity of the identity of the other. It is possible for effectively resisting attacks such as wiretapping, tampering, and replaying and the like for the network communication, realizing the secret communication between the nodes, effectively saving resources of the nodes of the sensor network, and prolonging the service lift of the sensor network in the method.

12 Claims, 2 Drawing Sheets

(51) Int. Cl.
  *H04L 29/06* (2006.01)
  *H04W 12/04* (2009.01)
  *H04W 84/18* (2009.01)
  *H04W 12/06* (2009.01)
  *H04L 29/08* (2006.01)

(52) U.S. Cl.
  CPC .............. *H04W 12/04* (2013.01); *H04W 84/18* (2013.01); *H04W 12/06* (2013.01); *H04L 67/12* (2013.01); *H04L 63/1441* (2013.01)
  USPC ........... 380/279; 380/277; 380/278; 380/285; 380/286; 380/255; 713/163; 713/150; 713/168; 713/169

(56) References Cited

U.S. PATENT DOCUMENTS

| 2008/0044028 | A1 | 2/2008 | Sun et al. | |
|---|---|---|---|---|
| 2008/0144835 | A1* | 6/2008 | Roy et al. | 380/278 |
| 2013/0159724 | A1* | 6/2013 | Kim et al. | 713/181 |

OTHER PUBLICATIONS

Jun, Y., "Research on Key Management Scheme in Wireless Sensor Networks," Full-Text Database of Excellence Master Dissertation of China, Mar. 31, 2007, complete document (English translation of Abstract is on p. II).

Hao, J., "Research on Key Management in Wireless Sensor Networks," Full-Text Database of Excellence Master Dissertation of China, Jul. 31, 2009, complete document (English translation of Abstract is on p. iv).

Eschenauer, L. et al., "A Key-Management Scheme for Distributed Sensor Networks," *Proceedings of the 9th ACM Conference on Computer and Communications Security, CCS 2002*, Nov. 18-22, 2002, pp. 41-47.

Chan, H. et al., "Random Key Predistribution Schemes for Sensor Networks," *Proceedings of the 2003 IEEE Symposium on Security and Privacy (SP'03)*, 2003, pp. 197-213.

Menezes, A. et al., "Handbook of Applied Cryptography, Chapter 10, Identification and Entity Authentication," *CRC Press, Inc.*, 1997, pp. 385-424.

* cited by examiner

KEY MANAGEMENT AND NODE AUTHENTICATION METHOD FOR SENSOR NETWORK

This application is a US National Stage of International Application No. PCT/CN2010/073466, filed 2 Jun. 2010, designating the United States, and claiming priority of Chinese Patent Application No. 200910218626.9, filed with the State Intellectual Property Office of China on Oct. 21, 2009 and entitled "KEY MANAGEMENT AND NODE AUTHENTICATION METHOD FOR SENSOR NETWORK", which is hereby incorporated by reference in its entirety.

FIELD OF THE INVENTION

The present invention relates to the field of network security and in particular a key management and node authentication method for a sensor network.

BACKGROUND OF THE INVENTION

A sensor network is composed of a large number of small-volume, cheap and battery powered sensor nodes capable of radio communication and monitoring. These nodes are deployed densely in a monitored region for the purpose of monitoring the real world. A network of radio sensors is a new research area of information technologies and finds its prospect of wide applications in environment monitoring, military affairs, national defense, controlled traffic, community security, protection against forest fire, target positioning, etc.

Since a sensor network is typically deployed in an unmanned and even enemy region, communication between nodes is subject to eavesdropping, tampering or replay, and the nodes themselves are subject to attacks such as interception, duplication, or falsification, so the security of the network is greatly endangered and it is desired to introduce key management, node authentication and other underlying security mechanisms so as to find and prevent from the above security threat, secure communication between the nodes and verify effectively the identity of a node in the network for legality. A key management mechanism is a basic of sensor network security. Existing methods fall into three categories in which a key is shared throughout the network, a key is shared between every two nodes and a random key is pre-distributed. Since a node in the sensor network is subject to an interception attack and strictly limited in its storage resource, but the first two key management methods either fail to deal with an interception attack on a node or require a considerable storage overhead, so neither of them can be fully applicable to the sensor network. The key management method in which a random key is pre-distributed has characteristics of good extensibility, high key connectivity, high resistance against destruction, etc., and is a currently practicable method. In this method, however, the same key may be distributed multiple times to different nodes, and when the nodes perform identity authentication with the key, each node can only verify another node for legality but can not confirm the identity of the another node, that is, end-to-end identity authentication is impossible. Also an authentication mechanism is a basic of sensor network security. Currently proposed mechanisms of authenticating a node in a sensor network are generally a light-weight authentication approach based upon a pre-shared key which is typically provided in a key management method adopted in the network. With the use of the existing random key pre-distribution approach in a network, a key generated in this way can not be used to provide a node in the network with an end-to-end authentication service, and in this event of only verifying another node for legality but failing to confirm the specific identity of the another node, the sensor network can not deal with interception, duplication, falsification and other attacks on a node, thus exposing the network to a great security risk.

SUMMARY OF THE INVENTION

In order to address the foregoing technical problem in the prior art, the invention provides a key management and node authentication method for a sensor network in which the sensor network can be provided with confidential communication and an end-to-end node authentication service.

In a technical solution of the invention, the invention provides a key management and node authentication method for a sensor network, which includes:

obtaining, by respective nodes, keys pre-distributed from a deployment server to establish secure connections between the nodes, and broadcasting, by each node, its identity identifier information to its neighbor nodes after the network is deployed;

determining, by each node, from the received identity identifier information transmitted from a neighbor node whether there is a shared key with the corresponding neighbor node, and if so, creating, by each node, a pair-wise key with the corresponding neighbor node; otherwise, creating, by each node, a pair-wise key with a node with a multi-hop secure connection thereto; and performing, by each node, identity authentication with the created pair-wise key prior to formal communication with another node to verify the identity of the other node for legality and validity.

Preferably, the method further includes: pre-distributing, by the deployment server, the keys to the respective nodes to establish secure connections between the nodes prior to deployment of the network.

Preferably, pre-distributing by the deployment server the keys to the respective nodes to establish secure connections between the nodes includes:

performing, by the deployment server, key pool initialization to generate a key pool KP including a plurality of keys and their key identifiers prior to deployment of the network, wherein the number of keys in the key pool is denoted as |KP|, and the deployment server is secure;

calculating the degree of each node as $d=(n-1)*(\ln n-\ln(-\ln P_c))/n$, wherein network connectivity is preset as $P_c$ and there are a number n of nodes each with a corresponding identifier ID in the network;

calculating the probability $p=d/n'$ that a key is pre-shared between every two adjacent nodes from the degree d of the node and an expected number n' of neighbor nodes of the node after the network is deployed; and allocating, by the deployment server, the keys to the respective nodes.

Preferably, allocating by the deployment server the keys to the respective nodes includes:

for a node $N_i$, the deployment server firstly constructing an ID list for the node $N_i$, which includes an N_ID field, a K_ID field, a K_STA field, a K_ATTR field and a K_AATR_EX field, wherein:

the N_ID field represents a node ID indicating the identifier value of the identity of a node sharing a key with the node $N_i$;

the K_ID field represents a key ID indicating the identifier value of the key shared between the node $N_i$ and the node identified by the N_ID field;

the K_STA field represents a key status indicating the status of the key identified by the K_ID field, wherein the value of the K_STA field is "Created" if the node $N_i$ has created a pair-wise key with the node identified by the N_ID field or otherwise "Not Created", and this field is initialized to "Not Created";

the K_ATTR field represents a key attribute, wherein the value of this field is significant, when the value of the K_STA field is "Created", to indicate whether the key identified by the K_ID field is a shared key or a path key, and this field is defaulted to indicate a shared key;

the K_ATTR_EX field represents an extended key attribute, wherein the value of this field is significant, when the key identified by the K_ATTR field is a path key, to indicate that whether the path key is a direct connection key or a multi-hop connection key, and this field is defaulted to indicate a direct connection key; and the K_VAL field represents a key value for storing the value of the key identified by the K_ID field;

after creating the ID list for the node $N_i$, the deployment server selecting randomly a number n*p of nodes from the remaining (n−1) nodes and inserting their node IDs respectively into the ID list of the node $N_i$; then the deployment server selecting a different key for each entry in the ID list from the key pool KP, inserting the identifiers of these keys and the corresponding key values respectively into the corresponding K_ID fields and K_VAL fields in the ID list of the node $N_i$ and deleting these keys and identifiers from the key pool KP; and finally the deployment server generating a number t (t<n') of standby key IDs different from the key IDs in the key pool KP initially generated by the deployment server and also loading them into the node $N_i$; and the deployment server recording all the information in the ID list of the node $N_i$, wherein the standby key IDs are subsequently used to identify pair-wise keys absent in KP, which are created separately from negotiation between the nodes;

for a node $N_j$, the deployment server pre-distributing keys to the node $N_j$ after pre-distributing the keys to the node $N_i$, wherein firstly the deployment server selects randomly a number n*p of nodes from the remaining (n−1) nodes and inserts their node IDs respectively into an ID list of the node $N_j$; then the deployment server selects a different key for each entry in the ID list of the node $N_j$ from the key pool KP, inserts the identifiers of these keys and the corresponding key values respectively into the corresponding K_ID fields and K_VAL fields in the ID list of the node $N_j$ and deletes these keys and identifiers from the key pool KP, but when the n*p nodes randomly selected for the node $N_j$ include the node $N_i$, no key will be reallocated to the nodes $N_j$ and $N_i$, and instead a shared key between them previously allocated to the node $N_i$ is allocated thereto, and the ID and the key value of the shared key are inserted respectively into the K_ID field and the K_VAL field of the entry in the ID list of the node $N_j$ corresponding to the node $N_i$; the deployment server generates a number t (t<n') of key IDs different from the key IDs in the initially generated key pool KP and the standby IDs of the node $N_i$ and also loads them into the node $N_j$; and the deployment server records all the information in the ID list of the node $N_j$; and for the remaining nodes, the deployment server distributing keys sequentially to the respective remaining nodes in the same way as the node $N_j$ after distributing the keys to the node $N_j$, and the deployment server recording information in ID lists of the respective remaining nodes.

Preferably, creating by each node a pair-wise key with the neighbor node includes:

each node broadcasting its identity identifier information to its neighbor nodes after the network is deployed; and upon reception of the broadcast message, the neighbor node determining from the identity identifier information therein whether to share a key with the broadcasting node, and if there is the same ID in an N_ID field in its ID list as the ID of the broadcasting node, it indicates that the neighbor node shares a key, i.e., a pair-wise key, with the node; and the neighbor node setting a K_STA field in a corresponding entry in a corresponding ID list to "Created" to indicate that a pair-wise key has been created with the broadcasting node, that is, a direct secure connection has been established.

Preferably, creating, by each node, a pair-wise key with a node with a multi-hop secure connection thereto includes:

when there is a secure path between a source node and a destination node, which is consisted of a plurality of nodes between every two of which there is a shared key, the source node generating a path key PK, selecting a different ID from standby path key IDs and transmitting the path key PK and a corresponding key ID together with the ID of the source node and the ID of the destination node to the destination node over the secure path with the destination node while being hop-wise encrypted and decrypted by the nodes along the secure path; and the destination node receiving and decrypting the key message of the source node to obtain the path key PK and then transmitting a key creation success message to the source node over the secure path with the source node to indicate that a secure connection has been established with the source node; and each of the source node and the destination node inserting the identity identifier ID of the other node into its ID list as a new entry, inserting the ID of PK and the value of PK into a corresponding K_ID field and K_VAL field and setting a corresponding K_STA field to "Created", a K_ATTR field to "Path Key" and a corresponding K_ATTR_EX field to "Direct Connection Key", if there is a single-hop path between the source node and the destination node when the path key is created, which indicates that each of the source node and the destination node comes into a range of direct communication with the other, or to "Multi-Hop Connection Key" otherwise.

Preferably, performing by each node identity authentication with the created pair-wise key prior to formal communication with another node to verify the identity of the other node for legality and validness includes:

a node A transmitting a message $ID_B \| K\_ID_{AB} \| N_A$ to a node B to request for authentication with the node B, wherein $K\_ID_{AB}$ represents the identifier of a pre-shared key of the node A and the node B, $N_A$ represents a random number generated by the node A, and $ID_B$ represents the identity identifier of the node B;

upon reception of the authentication request of the node A, the node B firstly determining whether $ID_B$ in the request message is identical with its identity identifier ID, and if not, the node B discarding the request message; otherwise, the node B determining whether a key corresponding to $K\_ID_{AB}$ is stored in its ID list, and if not, terminating authentication; otherwise, generating an inquiry $N_B$ and calculating $MAK_{AB} \| SK_{AB} = F(PSK_{AB}, ID_A \| ID_B \| N_A \| N_B)$ from $ID_A$, $ID_B$, $N_A$ and $N_B$ using the value of the K_VAL field in the ID list corresponding to $K\_ID_{AB}$, i.e., a pre-shared key $PSK_{AB}$ of the node A and the node B, wherein $MAK_{AB}$ represents a message authentication key between the node A and the node B, and $SK_{AB}$ represents a session key between the node A and the node B; and then generating a message authentication code $MAC_1=H(MAK_{AB}, ID_A\|N_A\|N_B)$ from $MAK_{AB}$ and constructing and transmitting a message $ID_A\|N_A\|N_B\|MAC_1$ to the node A, wherein F represents a key derivation algorithm, and H represents a message authentication code calculation method, both of which are typically a unidirectional function;

upon reception of the message of the node B, the node A firstly checking the inquiry $N_A$ in the message for consistency with the inquiry $N_A$ the node A transmitted, and if they are inconsistent, terminating authentication; otherwise, the node A calculating $MAK_{AB}\|SK_{AB}=F(PSK_{AB},ID_A\|ID_B\|N_A\|N_B)$ and calculating a message authentication code $MAC_2=H(MAK_{AB}, ID_A\|N_A\|N_B)$ from $MAK_{AB}$, and if $MAC_2=MAC_1$, the node A authenticating the node B successfully, storing $SK_{AB}$ as a session key with the node B, calculating $MAC_3=H(MAK_{AB},ID_B\|N_B)$ and transmitting $ID_B\|N_B\|MAC_3$ to the node B, wherein F represents a key derivation algorithm, and H represents a message authentication code calculation method, both of which are typically a unidirectional function; and upon reception of the message of the node A, the node B checking the inquiry $N_B$ in the message for consistency with the inquiry $N_B$ the node B has transmitted to the node A, and if they are inconsistent, failing with authentication; otherwise, the node B calculating $MAC_4=H(MAK_{AB},ID_B\|N_B)$, and if $MAC_4=MAC_3$, the node B authenticating the node A successfully, and the node B storing $SK_{AB}$ as a session key with the node A, calculating $MAC_5=H(MAK_{AB},ID_A\|N_A)$ and transmitting a message $ID_A\|N_A\|MAC_5$ to the node A, wherein F represents a key derivation algorithm, and H represents a message authentication code calculation method, both of which are typically a unidirectional function.

As can be apparent, the foregoing technical solution of the invention combines key management and node authentication mechanisms to provide an end-to-end identity authentication service between nodes in a sensor network while enabling confidential communication between the nodes, can prevent effectively from eavesdropping, tampering, replay and other attacks on network communication over the network, can enable confidential communication between the nodes and have the characteristic of enhancing the capability of the nodes to prevent from interception, duplication, falsification or other attacks and can enable distributed node cancellation to thereby provide the sensor network with an underlying solution to network security. Furthermore, the key management and node authentication method proposed according to the invention has a lower storage and calculation overhead and can conserve effectively the resource of nodes in the sensor network and lengthen a service lifetime of the sensor network as compared with the prior art.

DETAILED DESCRIPTION OF THE EMBODIMENTS

Figure 1:
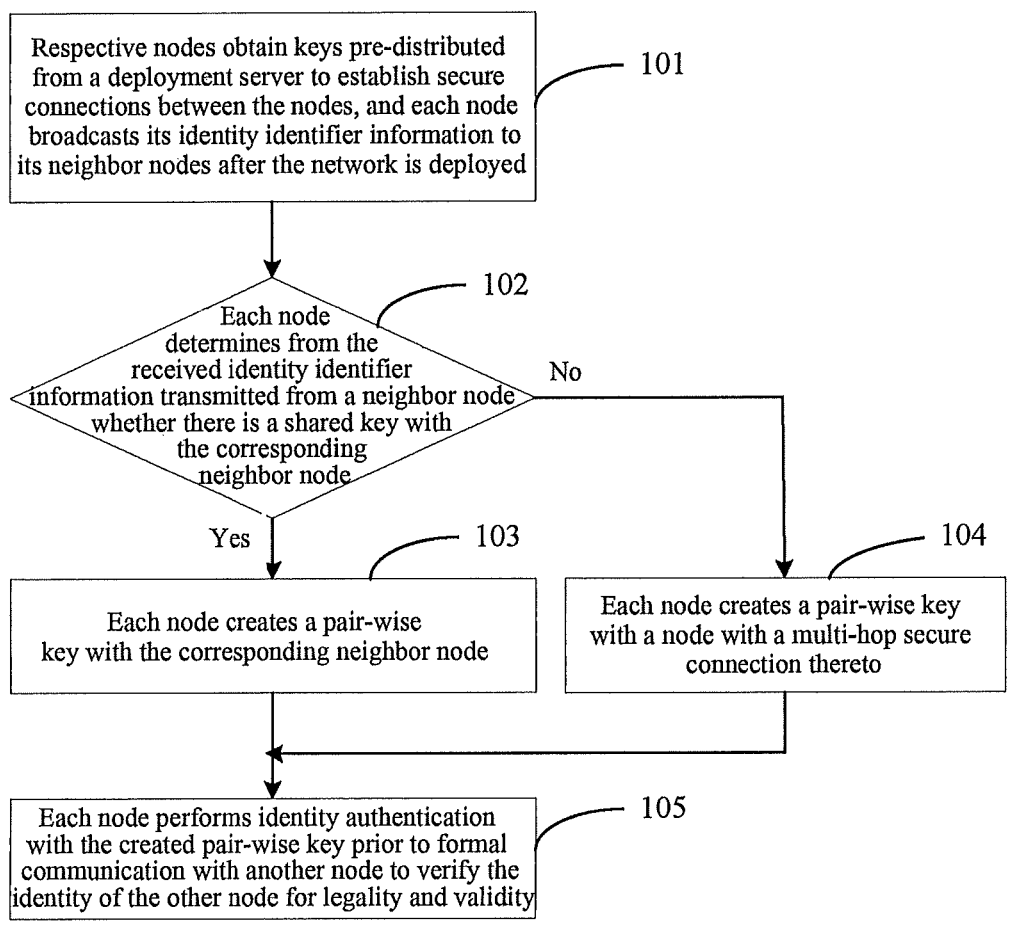
FIG. 1 is a flow chart of a key management and node authentication method for a sensor network according to an embodiment of the invention.

Reference is made to FIG. 1 illustrating a flow chart of a key management and node authentication method for a sensor network according to an embodiment of the invention, and this method includes the following steps.

Step 101: Respective nodes obtain keys pre-distributed from a deployment server to establish secure connections between the nodes, and each node broadcasts its identity identifier information to its neighbor nodes after the network is deployed.

Step 102: Each node determines from the received identity identifier information transmitted from a neighbor node whether there is a shared key with the corresponding neighbor node, and if so, the node performs the step 103 and the step 105; otherwise, it performs the step 104 and the step 105.

Step 103: Each node creates a pair-wise key with the corresponding neighbor node.

Step 104: Each node creates a pair-wise key with a node with a multi-hop secure connection thereto.

Step 105: Each node performs identity authentication with the created pair-wise key prior to formal communication with another node to verify the identity of the other node for legality and validity.

Preferably, the method can further include pre-distribution of the keys in which the deployment server pre-distributes the communication keys to the respective nodes to establish secure connections between the nodes prior to deployment of the network, and a specific implementation thereof is as follows.

1.1) The deployment server performs key pool initialization to generate a key pool KP including a plurality of keys and their key identifiers prior to deployment of the network. The number of keys in the key pool is denoted as |KP| which is sufficiently large, and it is assumed that the deployment server is secure.

1.2) Network connectivity is preset as $P_c$ and there are a number n of nodes each with a corresponding identifier ID in the network. The degree of each node is calculated as $d=(n-1)*(\ln n-\ln(-\ln P_c))/n$ under a classical random graph theory. The preset number n of nodes in the network is typically slightly larger than the actual number of nodes in the network in order to ensure good extensibility.

1.3) The probability p=d/n' that a key is pre-shared between every two adjacent nodes is calculated from the degree d of the node and an expected number n' of neighbor nodes of the node after the network is deployed.

1.4) The deployment server allocates the keys to the respective nodes to pre-distribute the keys to the nodes, and a specific implementation thereof is as follows:

1.4.1) For a node $N_i$, the deployment server firstly constructs an ID list for the node $N_i$, which includes an N_ID field, a K_ID field, a K_STA field, a K_ATTR field and a K_AATR_EX field;

| N_ID | K_ID | K_STA | K_ATTR | K_ATTR_EX | K_VAL |
|---|---|---|---|---|---|

Where:

The N_ID field represents a node ID indicating the identifier value of the identity of a node sharing a key with the node $N_i$;

The K_ID field represents a key ID indicating the identifier value of the key shared between the node $N_i$ and the node identified by the N_ID field;

The K_STA field represents a key status indicating the status of the key identified by the K_ID field. The value of the K_STA field is "Created" if the node $N_i$ has created a pair-wise key with the node identified by the N_ID field or otherwise "Not Created". This field is initialized to "Not Created";

The K_ATTR field represents a key attribute, and the value of this field is significant, when the value of the K_STA field is "Created", to indicate whether the key identified by the K_ID field is a shared key or a path key. This field is defaulted to indicate a shared key;

The K_ATTR_EX field represents an extended key attribute, and the value of this field is significant, when the key identified by the K_ATTR field is a path key, to indicate that whether the path key is a direct connection key or a multi-hop connection key. This field is defaulted to indicate a direct connection key; and The K_VAL field represents a key value for storing the value of the key identified by the K_ID field.

After creating the ID list for the node $N_i$, the deployment server selects randomly a number n*p of nodes from the remaining (n−1) nodes and inserts their node IDs respectively into the ID list of the node $N_i$; then the deployment server selects a different key for each entry in the ID list from the key pool KP, inserts the identifiers of these keys and the corresponding key values respectively into the corresponding K_ID fields and K_VAL fields in the ID list of the node $N_i$ and deletes these keys and identifiers from the key pool KP; and finally the deployment server generates a number t (t<n') of standby key IDs different from the key IDs in the key pool KP initially generated by the deployment server and also loads them into the node $N_i$; and the deployment server records all the information in the ID list of the node $N_i$; where the standby key IDs are subsequently used to identify pair-wise keys absent in KP, which are created separately from negotiation between the nodes;

1.4.2) For a node $N_j$, the deployment server pre-distributes keys to the node $N_j$ after pre-distributing the keys to the node $N_i$. Firstly the deployment server selects randomly a number n*p of nodes from the remaining (n−1) nodes and inserts their node IDs respectively into an ID list of the node $N_j$; then the deployment server selects a different key for each entry in the ID list of the node $N_j$ from the key pool KP, inserts the identifiers of these keys and the corresponding key values respectively into the corresponding K_ID fields and K_VAL fields in the ID list of the node $N_j$ and deletes these keys and identifiers from the key pool KP, but when the n*p nodes randomly selected for the node $N_j$ include the node $N_i$, no key will be reallocated to the nodes $N_j$ and $N_i$, and instead a shared key between them previously allocated to the node $N_i$ is allocated thereto, and the ID and the key value of the shared key are inserted respectively into the K_ID field and the K_VAL field of the entry in the ID list of the node $N_j$ corresponding to the node $N_i$; the deployment server generates a number t (t<n') of key IDs different from the key IDs in the initially generated key pool KP and the standby IDs of the node $N_i$ and also loads them into the node $N_j$; and the deployment server records all the information in the ID list of the node $N_j$; and 1.4.3) For the remaining nodes, the deployment server distributes keys sequentially to the respective remaining nodes in the same way as the node $N_j$ after distributing the keys to the node $N_j$. Also the deployment server records information in ID lists of the respective remaining nodes.

In the steps 101 to 104, a pair-wise key for a secure connection is created between the nodes after the network is deployed, and a specific implementation thereof is as follows.

2.1) A shared key is created, and a specific implementation of creating a pair-wise key between neighbor nodes with a shared key is as follows:

2.1.1) Each node broadcasts its identity identifier information to its neighbor nodes after the network is deployed; and 2.1.2) Upon reception of the broadcast message in 2.1.1), the neighbor node determines from the identity identifier information therein whether to share a key with the broadcasting node, and if there is the same ID in the N_ID field in its ID list as the ID of the broadcasting node, it indicates that the neighbor node shares a key, i.e., a pair-wise key, with the node; and the neighbor node sets the K_STA field in the corresponding entry in the corresponding ID list to "Created" to indicate that a pair-wise key has been created with the broadcasting node in 2.1.1), that is, a direct secure connection has been established.

2.2) A path key is created, and a specific implementation of creating a pair-wise key between nodes without a shared key but with a multi-hop secure connection is as follows:

2.2.1) When there is a secure path between a source node and a destination node, which is consisted of a plurality of nodes between every two of which there is a shared key, a method for ascertaining this secure path will not be introduced in the invention, and the source node generates a path key PK, selects a different ID from the standby path key IDs and transmits the path key PK and the corresponding key ID together with the ID of the source node and the ID of the destination node to the destination node over the secure path with the destination node while being hop-wise encrypted and decrypted by the nodes along the secure path; and 2.2.2) The destination node receives and decrypts the key message of the source node to obtain the path key PK and then transmits a key creation success message to the source node over the secure path with the source node to indicate that a secure connection has been established with the source node; and each of the source node and the destination node inserts the identity identifier ID of the other node into its ID list as a new entry, inserts the ID of PK and the value of PK into the corresponding K_ID field and K_VAL field and sets the corresponding K_STA field to "Created", the K_ATTR field to "Path Key" and the corresponding K_ATTR_EX field to "Direct Connection Key", if there is a single-hop path between the source node and the destination node when the path key is created, which indicates that each of them comes into a range of direct communication with the other, or to "Multi-Hop Connection Key" otherwise.

Figure 2:
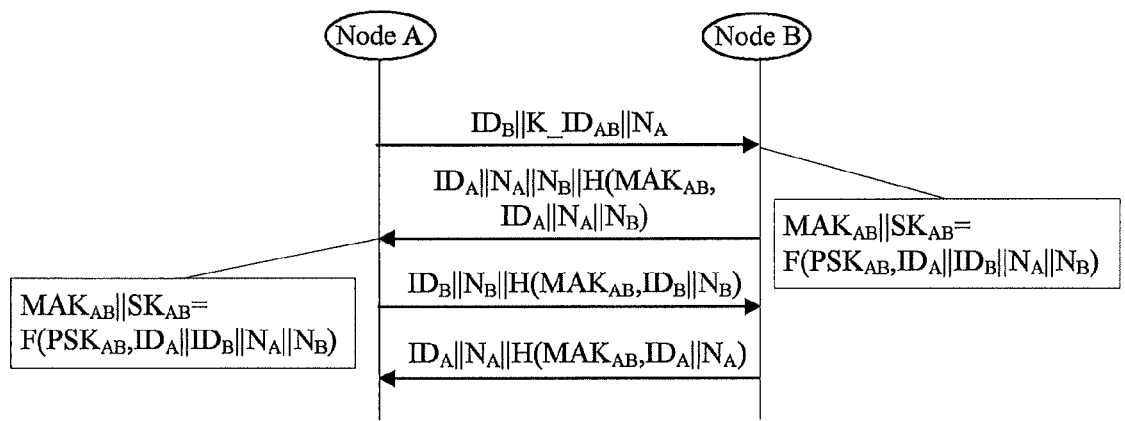
FIG. 2 is a flow chart of identity authentication between nodes according to an embodiment of the invention.

In the step 105, node identity authentication is performed. Prior to formal communication between the nodes, each node shall perform identity authentication to verify the identity of the other for legality and validness. Reference is made to FIG. 2 illustrating a flow chart of identity authentication between nodes according to an embodiment of the invention, and in this embodiment taking a node A and a node B as an example, the node authentication method is as follows.

3.1) The node A transmits a message $ID_B\|K\_ID_{AB}\|N_A$ to the node B to request for authentication with the node B, where $K\_ID_{AB}$ represents the identifier of a pre-shared key of the node A and the node B, $N_A$ represents a random number generated by the node A, and $ID_B$ represents the identity identifier of the node B.

3.2) Upon reception of the authentication request of the node A, the node B firstly determines whether $ID_B$ in the request message is identical with its identity identifier ID, and if not, the node B discards the request message; otherwise, the node B determines whether a key corresponding to $K\_ID_{AB}$ is stored in its ID list, and if not, it terminates authentication; otherwise, it generates an inquiry $N_B$ and calculates $MAK_{AB}\|SK_{AB}=F(PSK_{AB}, ID_A\|ID_B\|N_A\|N_B)$ from $ID_A$, $ID_B$, $N_A$ and $N_B$ using the value of the K_VAL field in the ID list corresponding to $K\_ID_{AB}$, i.e., a pre-shared key $PSK_{AB}$ of the node A and the node B, where $MAK_{AB}$ represents a message authentication key between the node A and the node B, and $SK_{AB}$ represents a session key between the node A and the node B. Then the node B generates a message authentication code $MAC_1 = H(MAK_{AB}, ID_A\|N_A\|N_B)$ from $MAK_{AB}$ and constructs and transmits a message $ID_A\|N_A\|N_B\|MAC_1$ to the node A. Where F represents a key derivation algorithm, and H represents a message authentication code calculation method, both of which are typically a unidirectional function, and the same applies below.

3.3) Upon reception of the message of the node B, the node A firstly checks the inquiry $N_A$ in the message for consistency with the inquiry $N_A$ it transmitted in the step 3.1), and if they are inconsistent, it terminates authentication; otherwise, the node A calculates $MAK_{AB}\|SK_{AB}=F(PSK_{AB}, ID_A\|ID_B\|N_A\|N_B)$ and calculates a message authentication code $MAC_2=H(MAK_{AB},ID_A\|N_A\|N_B)$ from $MAK_{AB}$, and if $MAC_2=MAC_1$, the node A authenticates the node B successfully, stores $SK_{AB}$ as a session key with the node B, calculates $MAC_3=H(MAK_{AB},ID_B\|N_B)$ and transmits $ID_B\|N_B\|MAC_3$ to the node B.

3.4) Upon reception of the message of the node A, the node B checks the inquiry $N_B$ in the message for consistency with the inquiry $N_B$ it transmits to the node A in the step 3.2), and if they are inconsistent, authentication fails; otherwise, the node B calculates $MAC_4=H(MAK_{AB},ID_B\|N_B)$, and if $MAC_4=MAC_3$, the node B authenticates the node A successfully, and the node B stores $SK_{AB}$ as a session key with the node A, calculates $MAC_5=H(MAK_{AB},ID_A\|N_A)$ and transmits a message $ID_A\|N_A\|MAC_5$ to the node A. The authentication flow ends.

The invention proposes a flow of performing a key management and node authentication method for a sensor network based upon the sensor network key management method in which a random key is pre-distributed and a key is shared between every two nodes, to provide confidential communication between the nodes in the sensor network. Also end-to-end identity authentication based upon a pre-shared key between the nodes in the sensor network is performed with keys and their binding relationships with node IDs generated in this method.

The foregoing description is merely illustrative of the preferred embodiments of the invention, and it shall be noted that those ordinarily skilled in the art can further make several adaptations and modifications without departing from the principle of the invention and these adaptations and modifications shall also be construed as coming into the scope of the invention.

The invention claimed is:

1. A key management and node authentication method for a sensor network, comprising:
   obtaining, by respective nodes, keys pre-distributed from a deployment server to establish secure connections between the nodes, and broadcasting, by each node, its identity identifier information to its neighbor nodes after the network is deployed;
   determining, by each node, from the received identity identifier information transmitted from a neighbor node whether there is a shared key with the corresponding neighbor node, and if so, creating, by each node, a pair-wise key with the corresponding neighbor node; otherwise, creating, by each node, a pair-wise key with a node with a multi-hop secure connection thereto; and
   performing, by each node, identity authentication with the created pair-wise key prior to formal communication with another node to verify the identity of the other node for legality and validity,
   wherein each node is configured with an ID list comprising an N_ID field, a K_ID field, a K_STA field, a K_ATTR field, a K_ATTR_EX field and a K_VAL field wherein:
   the N_ID field represents a node ID indicating the identifier value of the identity of a node sharing a key with the each node;
   the K_ID field represents a key ID indicating the identifier value of the key shared between the each node and the node identified by the N_ID field;
   the K_STA field represents a key status indicating the status of the key identified by the K_ID field, wherein the value of the K_STA field is "Created" if the each node has created a pair-wise key with the node identified by the N_ID field or otherwise "Not Created", and this field is initialized to "Not Created";
   the K_ATTR field represents a key attribute, wherein the value of this field is significant, when the value of the K_STA field is "Created", to indicate whether the key identified by the K_ID field is a shared key or a path key, and this field is defaulted to indicate a shared key;
   the K_ATTR_EX field represents an extended key attribute, wherein the value of this field is significant, when the key identified by the K_ATTR field is a path key, to indicate that whether the path key is a direct connection key or a multi-hop connection key, and this field is defaulted to indicate a direct connection key; and
   the K_VAL field represents a key value to store the value of the key identified by the K_ID field,
   wherein creating by each node a pair-wise key with the corresponding neighbor node comprises:
   each node broadcasting its identity identifier information to its neighbor nodes after the network is deployed; and
   upon reception of the broadcast message of the node transmitting the identity identifier information, the neighbor node determining from the identity identifier information therein whether to share a key with the node transmitting the identity identifier information, and if there is the same ID in the N_ID field in its ID list as the ID of the node transmitting the identity identifier information, it indicates that the neighbor node shares a key with the node transmitting the identity identifier information, wherein the key is a pair-wise key; and the neighbor node setting the K_STA field in a corresponding entry in a corresponding ID list to "Created" to indicate that a pair-wise key has been created with the node transmitting the identity identifier information.

2. The method according to claim 1, further comprising: pre-distributing, by the deployment server, the keys to the respective nodes to establish secure connections between the nodes prior to deployment of the network.

3. The key management and node authentication method for a sensor network according to claim 1, wherein pre-distributing by the deployment server the keys to the respective nodes to establish secure connections between the nodes comprises:
   performing, by the deployment server, key pool initialization to generate a key pool KP comprising a plurality of keys and their key identifiers prior to deployment of the network, wherein the number of keys in the key pool is denoted as |KP|, and the deployment server is secure;
   calculating the degree of each node as $d=(n-1)*(\ln n-\ln(-\ln P_c))/n$, wherein network connectivity is preset as $P_c$ and there are a number n of nodes each with a corresponding identifier ID in the network;
   calculating the probability $p=d/n'$ that a key is pre-shared between every two adjacent nodes from the degree d of the node and an expected number n' of neighbor nodes of the node after the network is deployed; and
   allocating, by the deployment server, the keys to the respective nodes.

4. The method according to claim 3, wherein allocating by the deployment server the keys to the respective nodes comprises:

for a node $N_i$, the deployment server firstly constructing the ID list for the node after creating the ID list for the node $N_i$, the deployment server selecting randomly a number n*p of nodes from the remaining (n−1) nodes and inserting their node IDs respectively into the ID list of the node $N_i$; then the deployment server selecting a different key for each entry in the ID list from the key pool KP, inserting the identifiers of these keys and the corresponding key values respectively into the corresponding K_ID fields and K_VAL fields in the ID list of the node N, and deleting these keys and identifiers from the key pool KP; and finally the deployment server generating a number t (t<n') of standby key IDs different from the key IDs in the key pool KP initially generated by the deployment server and also loading them into the node $N_i$; and the deployment server recording all the information in the ID list of the node $N_i$;

for a node $N_j$, the deployment server pre-distributing keys to the node $N_j$ after pre-distributing the keys to the node $N_i$, wherein firstly the deployment server selects randomly a number n*p of nodes from the remaining (n−1) nodes and inserts their node IDs respectively into an ID list of the node $N_j$; then the deployment server selects a different key for each entry in the ID list of the node $N_j$ from the key pool KP, inserts the identifiers of these keys and the corresponding key values respectively into the corresponding K_ID fields and K_VAL fields in the ID list of the node N, and deletes these keys and identifiers from the key pool KP, but when the n*p nodes randomly selected for the node $N_j$ comprise the node $N_i$, no key will be reallocated to the nodes $N_j$ and $N_i$, and instead a shared key between them previously allocated to the node N, is allocated thereto, and the ID and the key value of the shared key are inserted respectively into the K_ID field and the K_VAL field of the entry in the ID list of the node $N_j$, corresponding to the node $N_i$; the deployment server generates a number t (t<n') of key IDs different from the key IDs in the initially generated key pool KP and the standby IDs of the node N, and also loads them into the node $N_j$; and the deployment server records all the information in the ID list of the node $N_j$; and for the remaining nodes, the deployment server distributing keys sequentially to the respective remaining nodes in the same way as the node $N_j$ after distributing the keys to the node $N_j$, and the deployment server recording information in ID lists of the respective remaining nodes.

5. The method according to claim 4, wherein creating, by each node, a pair-wise key with a node with a multi-hop secure connection thereto comprises:

when there is a secure path between a source node and a destination node, which is consisted of a plurality of nodes between every two of which there is a shared key, the source node generating a path key PK, selecting a different ID from standby path key IDs and transmitting the path key PK and a corresponding key ID together with the ID of the source node and the ID of the destination node to the destination node over the secure path with the destination node while being hop-wise encrypted and decrypted by the nodes along the secure path; and the destination node receiving and decrypting a key message of the source node to obtain the path key PK and then transmitting a key creation success message to the source node over the secure path with the source node to indicate that a secure connection has been established with the source node; and each of the source node and the destination node inserting the identity identifier ID of the other node into its ID list as a new entry, inserting the ID of PK and the value of PK into a corresponding K_ID field and K_VAL field and setting a corresponding K_STA field to "Created", a K_ATTR field to "Path Key" and a corresponding K_ATTR_EX field to "Direct Connection Key", if there is a single-hop path between the source node and the destination node when the path key is created, which indicates that each of the source node and the destination node comes into a range of direct communication with the other, or to "Multi-Hop Connection Key" otherwise.

6. The method according to claim 4, wherein performing by each node identity authentication with the created pair-wise key prior to formal communication with another node to verify the identity of the other node for legality and validness comprises:

a node A transmitting a message $ID_B \| K\_ID_{AB} \| N_A$ to a node B to request for authentication with the node B, wherein $K\_ID_{AB}$ represents the identifier of a pre-shared key of the node A and the node B, $N_A$ represents a random number generated by the node A, and $ID_B$ represents the identity identifier of the node B;

upon reception of the authentication request of the node A, the node B firstly determining whether $ID_B$ in the request message is identical with its identity identifier ID, and if not, the node B discarding the request message; otherwise, the node B determining whether a key corresponding to $K\_ID_{AB}$ is stored in its ID list, and if not, terminating authentication; otherwise, generating an inquiry $N_B$ and calculating $MAK_{AB} \| SK_{AB} = F(PSK_{AB}, ID_A \| ID_B \| N_A \| N_B)$ from $ID_A$, $ID_B$, $N_A$ and $N_B$ using the value of the K_VAL field in the ID list corresponding to $K\_ID_{AB}$, wherein the value of the K_VAL field is a pre-shared key $PSK_{AB}$ of the node A and the node B, wherein $MAK_{AB}$ represents a message authentication key between the node A and the node B, and $SK_{AB}$ represents a session key between the node A and the node B; and then generating a message authentication code $MAC_1 = H(MAK_{AB}, ID_A \| N_A \| N_B)$ from $MAK_{AB}$ and constructing and transmitting a message $ID_A \| N_A \| N_B \| MAC_1$ to the node A, wherein F represents a key derivation algorithm, and H represents a message authentication code calculation method, both of which are typically a unidirectional function;

upon reception of the message of the node B, the node A firstly checking the inquiry $N_A$ in the message for consistency with the inquiry $N_A$ the node A transmitted, and if they are inconsistent, terminating authentication; otherwise, the node A calculating $MAK_{AB} \| SK_{AB} = F(PSK_{AB}, ID_A \| ID_B \| N_A \| N_B)$ and calculating a message authentication code $MAC_2 = H(MAK_{AB}, ID_A \| N_A \| N_B$ from $MAK_{AB}$, and if $MAC_2 = MAC_1$, the node A authenticating the node B successfully, storing $SK_{AB}$ as a session key with the node B, calculating $MAC_3 = H(MAK_{AB}, ID_B \| N_B)$ and transmitting $ID_B \| N_B \| MAC_3$ to the node B, wherein F represents a key derivation algorithm, and H represents a message authentication code calculation method, both of which are typically a unidirectional function; and upon reception of the message of the node A, the node B checking the inquiry NB in the message for consistency with the inquiry NB the node B has transmitted to the node A, and if they are inconsistent, failing with authentication; otherwise, the node B calculating MAC4=H(MAKAB,IDB∥NB), and if MAC4=MAC3, the node B authenticating the node A successfully, and the node B storing SKAB as a session key with the node A, calculating MAC5=H(MAKAB,IDA∥NA) and transmitting a message IDA∥NA∥MAC5 to the node A, wherein F represents a key derivation algorithm, and H represents a message authentication code calculation method, both of which are typically a unidirectional function.

7. A key management and node authentication method for a sensor network comprising:

obtaining, by respective nodes, keys pre-distributed from a deployment server to establish secure connections between the nodes, and broadcasting, by each node, its identity identifier information to its neighbor nodes after the network is deployed;
 determining, by each node, from the received identity identifier information transmitted from a neighbor node whether there is a shared key with the corresponding neighbor node, and if so, creating, by each node, a pair-wise key with the corresponding neighbor node; otherwise, creating, by each node, a pair-wise key with a node with a multi-hop secure connection thereto; and
 performing, by each node, identity authentication with the created pair-wise key prior to formal communication with another node to verify the identity of the other node for legality and validity,
 wherein each node is configured with an ID list comprising an N_ID field, a K_ID field, a K_STA field, a K_ATTR field, a K_ATTR_EX field and a K_VAL field wherein:
 the N_ID field represents a node ID indicating the identifier value of the identity of a node sharing a key with the each node;
 the K_ID field represents a key ID indicating the identifier value of the key shared between the each node and the node identified by the N_ID field;
 the K_STA field represents a key status indicating the status of the key identified by the K_ID field, wherein the value of the K_STA field is "Created" if the each node has created a pair-wise key with the node identified by the N_ID field or otherwise "Not Created", and this field is initialized to "Not Created";
 the K_ATTR field represents a key attribute, wherein the value of this field is significant, when the value of the K_STA field is "Created", to indicate whether the key identified by the K_ID field is a shared key or a path key, and this field is defaulted to indicate a shared key;
 the K_ATTR_EX field represents an extended key attribute, wherein the value of this field is significant, when the key identified by the K_ATTR field is a path key, to indicate that whether the path key is a direct connection key or a multi-hop connection key, and this field is defaulted to indicate a direct connection key; and
 the K_VAL field represents a key value for storing the value of the key identified by the K_ID field,
 wherein creating, by each node, a pair-wise key with a node with a multi-hop secure connection thereto comprises:
  when there is a secure path between a source node and a destination node, which is consisted of a plurality of nodes between every two of which there is a shared key, the source node generating a path key PK, selecting a different ID from standby path key IDs and transmitting the path key PK and a corresponding key ID together with the ID of the source node and the ID of the destination node to the destination node over the secure path with the destination node while being hop-wise encrypted and decrypted by the nodes along the secure path; and
  the destination node receiving and decrypting a key message of the source node to obtain the path key PK and then transmitting a key creation success message to the source node over the secure path with the source node to indicate that a secure connection has been established with the source node; and each of the source node and the destination node inserting the identity identifier ID of the other node into its ID list as a new entry, inserting the ID of PK and the value of PK into a corresponding K_ID field and K_VAL field and setting a corresponding K_STA field to "Created", a K_ATTR field to "Path Key" and a corresponding K_ATTR_EX field to "Direct Connection Key", if there is a single-hop path between the source node and the destination node when the path key is created, which indicates that each of the source node and the destination node comes into a range of direct communication with the other, or to "Multi-Hop Connection Key" otherwise.

8. The method according to claim 7, further comprising:
 pre-distributing, by the deployment server, the keys to the respective nodes to establish secure connections between the nodes prior to deployment of the network.

9. The method according to claim 7, wherein pre-distributing by the deployment server the keys to the respective nodes to establish secure connections between the nodes comprises:
 performing, by the deployment server, key pool initialization to generate a key pool KP comprising a plurality of keys and their key identifiers prior to deployment of the network, wherein the number of keys in the key pool is denoted as |KP|, and the deployment server is secure;
 calculating the degree of each node as $d=(n-1)*(\ln n - \ln(-\ln P_c))/n$, wherein network connectivity is preset as $P_c$ and there are a number n of nodes each with a corresponding identifier ID in the network;
 calculating the probability $p=d/n'$ that a key is pre-shared between every two adjacent nodes from the degree d of the node and an expected number n' of neighbor nodes of the node after the network is deployed; and
 allocating, by the deployment server, the keys to the respective nodes.

10. A key management and node authentication method for a sensor network comprising:
 obtaining, by respective nodes, keys pre-distributed from a deployment server to establish secure connections between the nodes, and broadcasting, by each node, its identity identifier information to its neighbor nodes after the network is deployed;
 determining, by each node, from the received identity identifier information transmitted from a neighbor node whether there is a shared key with the corresponding neighbor node, and if so, creating, by each node, a pair-wise key with the corresponding neighbor node; otherwise, creating, by each node, a pair-wise key with a node with a multi-hop secure connection thereto; and
 performing, by each node, identity authentication with the created pair-wise key prior to formal communication with another node to verify the identity of the other node for legality and validity,
 wherein each node is configured with an ID list comprising an N_ID field, a K_ID field, a K_STA field, a K_ATTR field, a K_ATTR_EX field and a K_VAL field wherein:

the N_ID field represents a node ID indicating the identifier value of the identity of a node sharing a key with the each node;

the K_ID field represents a key ID indicating the identifier value of the key shared between the each node and the node identified by the N_ID field;

the K_STA field represents a key status indicating the status of the key identified by the K_ID field, wherein the value of the K_STA field is "Created" if the each node has created a pair-wise key with the node identified by the N_ID field or otherwise "Not Created", and this field is initialized to "Not Created";

the K_ATTR field represents a key attribute, wherein the value of this field is significant, when the value of the K_STA field is "Created", to indicate whether the key identified by the K_ID field is a shared key or a path key, and this field is defaulted to indicate a shared key;

the K_ATTR_EX field represents an extended key attribute, wherein the value of this field is significant, when the key identified by the K_ATTR field is a path key, to indicate that whether the path key is a direct connection key or a multi-hop connection key, and this field is defaulted to indicate a direct connection key; and the K_VAL field represents a key value for storing the value of the key identified by the K_ID field, wherein performing by each node identity authentication with the created pair-wise key prior to formal communication with another node to verify the identity of the other node for legality and validness comprises:

a node A transmitting a message $ID_B\|K\_ID_{AB}\|N_A$ to a node B to request for authentication with the node B, wherein $K\_ID_{AB}$ represents the identifier of a pre-shared key of the node A and the node B, $N_A$ represents a random number generated by the node A, and $ID_B$ represents the identity identifier of the node B;

upon reception of the authentication request of the node A, the node B firstly determining whether $ID_B$ in the request message is identical with its identity identifier ID, and if not, the node B discarding the request message; otherwise, the node B determining whether a key corresponding to $K\_ID_{AB}$ is stored in its ID list, and if not, terminating authentication; otherwise, generating an inquiry $N_B$ and calculating $MAK_{AB}\|SK_{AB}=F(PSK_{AB}, ID_A\|ID_B\|N_A\|N_B)$ from $ID_A$, $ID_B$, $N_A$ and $N_B$ using the value of the K_VAL field in the ID list corresponding to $K\_ID_{AB}$, wherein the value of the K_VAL field is a pre-shared key $PSK_{AB}$ of the node node and the node B, wherein $MAK_{AB}$ represents a message authentication key between the node A and the node B, and $SK_{AB}$ represents a session key between the node A and the node B; and then generating a message authentication code $MAC_1=H(MAK_{AB}, ID_A\|N_A\|N_B)$ from $MAK_{AB}$ and constructing and transmitting a message $ID_A\|N_A\|N_B\|MAC_1$ to the node A, wherein F represents a key derivation algorithm, and H represents a message authentication code calculation method, both of which are typically a unidirectional function;

upon reception of the message of the node B, the node A firstly checking the inquiry $N_A$ in the message for consistency with the inquiry $N_A$ the node A transmitted, and if they are inconsistent, terminating authentication; otherwise, the node A calculating $MAK_{AB}\|SK_{AB}=F(PSK_{AB}, ID_A\|ID_B\|N_A\|N_B)$ and calculating a message authentication code $MAC_2=H(MAK_{AB}, ID_A\|N_A\|N_B)$ from $MAK_{AB}$, and if $MAC_2=MAC_1$, the node A authenticating the node B successfully, storing $SK_{AB}$ as a session key with the node B, calculating $MAC_3=H(MAK_{AB}, ID_B\|N_B)$ and transmitting $ID_B\|N_B\|MAC_3$ to the node B, wherein F represents a key derivation algorithm, and H represents a message authentication code calculation method, both of which are typically a unidirectional function; and upon reception of the message of the node A, the node B checking the inquiry $N_B$ in the message for consistency with the inquiry $N_B$ the node B has transmitted to the node A, and if they are inconsistent, failing with authentication; otherwise, the node B calculating $MAC_4=H(MAK_{AB}, ID_B\|N_B)$, and if $MAC_4=MAC_3$, the node B authenticating the node A successfully, and the node B storing $SK_{AB}$ as a session key with the node A, calculating $MAC_5=H(MAK_{AB}, ID_A\|N_A)$ and transmitting a message $ID_A\|N_A\|MAC_5$ to the node A, wherein F represents a key derivation algorithm, and H represents a message authentication code calculation method, both of which are typically a unidirectional function.

11. The method according to claim 10, further comprising:
pre-distributing, by the deployment server, the keys to the respective nodes to establish secure connections between the nodes prior to deployment of the network.

12. The method according to claim 10, wherein pre-distributing by the deployment server the keys to the respective nodes to establish secure connections between the nodes comprises:

performing, by the deployment server, key pool initialization to generate a key pool KP comprising a plurality of keys and their key identifiers prior to deployment of the network, wherein the number of keys in the key pool is denoted as $\|KP\|$, and the deployment server is secure;

calculating the degree of each node as $d=(n-1)*(\ln n - \ln(-\ln P,))/n$, wherein network connectivity is preset as P, and there are a number n of nodes each with a corresponding identifier ID in the network;

calculating the probability $p=d/n'$ that a key is pre-shared between every two adjacent nodes from the degree d of the node and an expected number n' of neighbor nodes of the node after the network is deployed; and allocating, by the deployment server, the keys to the respective nodes.

* * * * *

UNITED STATES PATENT AND TRADEMARK OFFICE
CERTIFICATE OF CORRECTION

Page 1 of 1

PATENT NO. : 8,913,751 B2
APPLICATION NO. : 13/503171
DATED : December 16, 2014
INVENTOR(S) : Du et al.

It is certified that error appears in the above-identified patent and that said Letters Patent is hereby corrected as shown below:

In the Claims

<u>In Column 11</u>

At lines 14, 32, 37 and 43, Claim 4 please change "N" to -- $N_i$ --.

<u>In Column 14</u>

At line 38, Claim 9 please change "P" to -- Pc --.

<u>In Column 16</u>

At line 46, Claim 12 please change "P" to -- Pc -- at both occurrences.

Signed and Sealed this
Eighth Day of March, 2016

Michelle K. Lee
*Director of the United States Patent and Trademark Office*